United States Patent [19]

Profeta

[11] 4,378,883
[45] Apr. 5, 1983

[54] BICYCLE CARRYING CASE

[76] Inventor: Joseph G. Profeta, 16810 5th Ave. East, Spanaway, Wash. 98387

[21] Appl. No.: 220,467

[22] Filed: Dec. 29, 1980

[51] Int. Cl.³ .............................................. B60R 9/10
[52] U.S. Cl. ................................ 206/335; 150/52 K; 224/42.03 B
[58] Field of Search ............... 206/335, 315 R, 5, 6; 150/52 K; 217/37; 224/42.03 A, 42.03 B

[56] References Cited

U.S. PATENT DOCUMENTS

| | | | |
|---|---|---|---|
| 2,732,061 | 1/1956 | Wilcox | 206/5 R |
| 3,734,272 | 5/1973 | Galen | 206/335 |
| 3,871,546 | 3/1975 | Thompson | 206/335 X |
| 3,886,988 | 6/1975 | Garrett et al. | 206/335 X |
| 3,968,913 | 7/1976 | Weed et al. | 150/52 K X |

Primary Examiner—Steven M. Pollard
Attorney, Agent, or Firm—Wagner & Bachand

[57] ABSTRACT

An improved bicycle transport container comprising a pair of hinged sides including an interior configured to hold a bicycle with minimum of unused interior which is space. The hinged sides contain matching openings therethrough which coincide with the position of the frame opening in a conventional bicycle whereby the container when closed and either containing a bicycle or not may be easily transported by hand or over the shoulder using the opening as the point of grip or support. The container is preferably formed of two unitary sides of vacuum formed plastic resin sheet material and may be lined with padding material to cushion the container. Optionally, the container may include additional openings or fasteners on one or both sides of the container to engage support hangers for storage of the container and bicycle or for transportation as on a rear bumper carrier of a vehicle. The entire container may be of a unitary member employing an integral hinge between the sides.

4 Claims, 7 Drawing Figures

4,378,883

BICYCLE CARRYING CASE

BACKGROUND OF THE INVENTION

In most cases a bicycle when in need of storage or transport is either handled without protection or contained within a rather cumbersome box typically having a volume double that of the bicycle itself. Even with such large sized containers they usually do not provide effective protection from piercing-type objects, from falls, or from the weather. A number attempts have been made to improve the transport and storage of bicycles and these are represented by the following U.S. Pat. Nos. 4,149,634 Lewis, Jr. 3,949,528 Hartger 3,929,225 Locke 3,886,988 Garrett 3,865,166 Pedro 3,734,272 Galen 3,079,172 Burwell.

From review of these patents and other publications that one might incur, it is apparent that none of the containers meet the full needs of the modern bicycle owner, particularly one owning a competition or other bicycle with values running into many hundreds of dollars.

Likewise, when the need occurs to transport a bicycle on a vehicle such as an automobile, typically the bicycle is transported on a pair of hooks secured to a U-shaped frame upstanding from the bumper of the vehicle. The bicycle is thus subject to full inclement weather or possible damage from gravel and stones, or other objects thrown up during transport.

Also, the containers available for bicycles add significantly to the weight and at the same time are of such bulk and weight that they are difficult, if not impossible, for one person to carry. Even the corregated cardboard boxes often used by airlines for transport of bicycles are of such bulk that even with a lightweight bicycle contained therein, two persons are required to carry such a container, and poor hand-holds are provided. The wasted cubage of such a container which is in the shape of a rectilinear three dimensional box is a critical loss of storage space.

BRIEF DESCRIPTION OF THE INVENTION

With the foregoing background in mind, it is a general object of this invention to improve bicycle transportation.

Another object of this invention is to provide a bicycle transportation container of minimum overall volume.

Another object of this invention is to provide a bicycle container providing effective protection for a bicycle from damage from the weather or external conditions, and from blows of objects striking the container, or from dropping of the container.

Another object of the invention is to provide a bicycle container which is easily transported by one person, either by hand or over the shoulder.

Another object of the invention is to provide a bicycle container which is adaptable to transport on conventional bicycle racks while still maintaining the protection from weather and other damage.

Each of these objects are achieved in accordance with this invention in which the preferred embodiment comprises a pair of formed sides joined together but openable to receive a bicycle and an interior of minimum practical space required for the bicycle. The sides may be hinged at the bottom or at the edge but meet in a clamshell mode with means for securing the sides together to provide a virtually weatherproof container.

The container conforms generally to the shape of the bicycle either fully assembled or in the preferred embodiment partially disassembled with front wheel removed, seat and handlebars removed or displaced for minimum volume. The conformance with the shape of the bicycle is particularly true in that the container sides have openings which generally match the usual triangular opening of the bicycle frame. The sides are sealed around the opening as well to prevent entrance of moisture. The opening corresponding to the frame opening is of sufficient size to allow one to carry the container on his shoulder by passage of the shoulder through the opening. The generally curved shape of the container sides in the region of the opening provide a comfortable carrying surface. The size and shape of the container also allows the carrying person to maintain full control of the container without loss of mobility or of view by merly holding the bottom of the container with the same hand as the shoulder crossing through the container opening.

The container opening further is bounded by a generally circular region enclosing the upper frame member of the bicycle whereby one can transport the bicycle and container merely by grasping the upper generally horizontal central portion of the container.

The container of one embodiment includes a plurality of additional openings sealed against the weather but matching the hooks of standard bicycle automobile bumper carriers. In another embodiment the container includes its own fastening means.

DETAILED DESCRIPTION OF THE DRAWINGS

Figure 1:
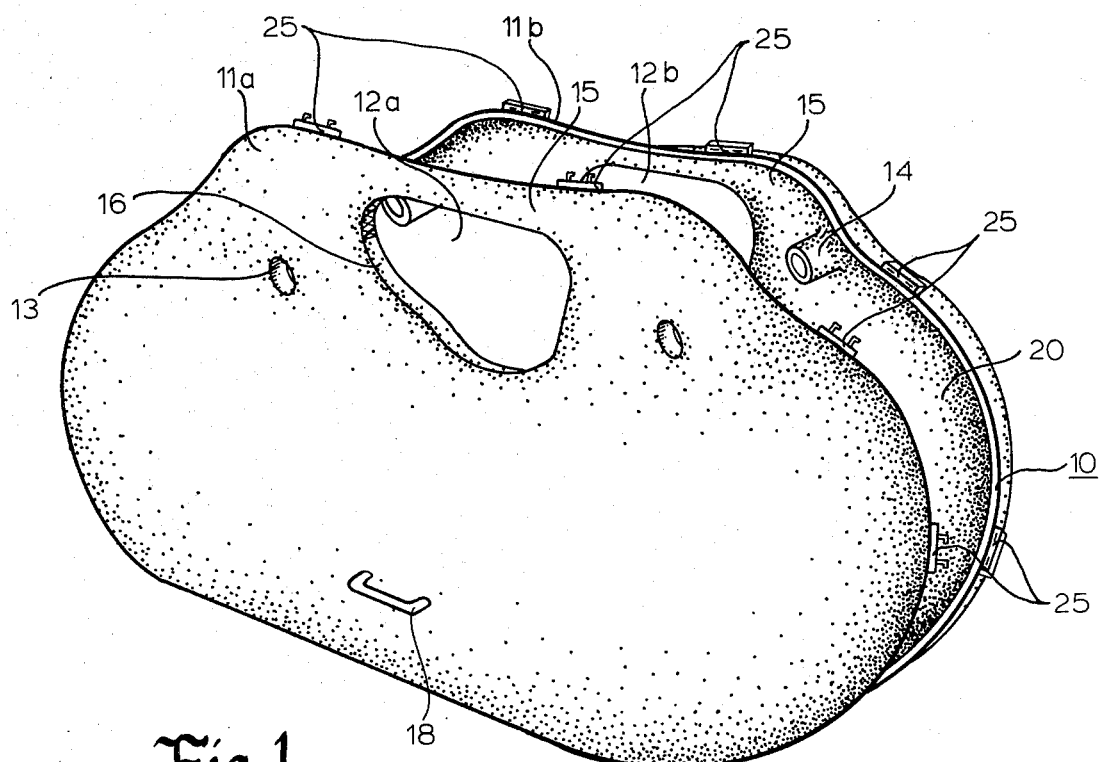
FIG. 1 is a view of the bicycle carrying case of the present invention in a partially open position.

As indicated above, the object of this invention is to improve bicycle transportation. A bicycle carrying case which attempts to meet these requirements are as follows; the case must be of a minimum overall volume, easily transported by one person, must protect the bicycle from weather damage, and must adapt to transport on conventional bike racks. Each of these requirements are met by the device in FIG. 1.

Now referring to FIGS. 1–4, a bicycle carrying case 10 is seen to consist of two hinged side walls 11a and 11b which open in a clamshell manner. Included in each side wall 11a and 11b is an aperture 12a and 12b which corresponds in location and possibly in shape to the open region in the frame of a bicycle when placed within the carrying case. The uppermost portion of defining the aperture 12 forms a shoulder bar 15 for carrying the case over the shoulder. Padding such as foam rubber pads 15A and 15B approving in FIGS. 3 and 4 add to the comfort of the carrier. The bike carrying case is sealed and water-proofed in the area of the aperture 12 by the meeting of aperture walls 16. Located on the side walls 11A and 11B is a pair of rack holes 13 through which a rack bar fits when the carrying case is being carried on a conventional bike rack. In one embodiment, tubular extension 14 which is seen on the inside of the side wall 11b, fits inside of a large tubular extention on wall 11a and forms a weatherproof seal. Cushioning material 20 is seen secured to side wall 11b along the inside of the carrying case. When the case is shut a plurality of fasteners 25 are snapped and the case is locked. The fasteners used are of the type commonly used for luggage.

Figure 2:
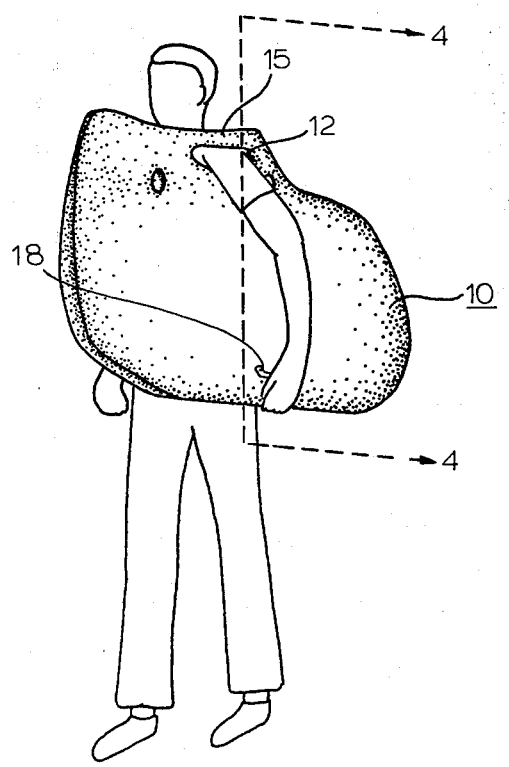
FIG. 2 shows the bicycle carrying case of the invention as carried over the shoulder of a person.

Now referring specifically to FIG. 2, a bicycle carrying case 10 is seen being hand carried over the shoulder of a person. The bike case 10 is carried by placing an arm through the aperture 12 whereby the shoulder bar 15 and padding 15A and B of FIGS. 3 and 4 rest on the shoulder of the person and the hand of the person grips a handgrip 18 or the hinge region 32 of the bicycle carrying case 10. This arrangement allows for the bike carrying case 10 to be steadied by the person holding the case and allows free use of the other hand. The design of this invention is such that the total weight of the bicycle and case is rather uniformly distributed for ease of carrying.

Figure 3:
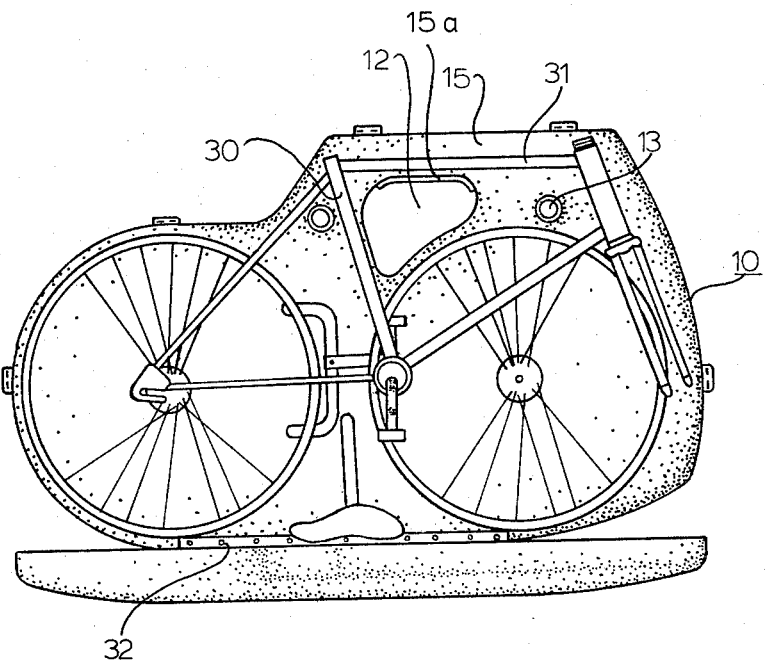
FIG. 3 is a side view of the bicycle case of the present invention, shown in the open position with a bicycle contained therein.

Now referring specifically to FIG. 3, a view of the bike carrying case 10 is seen opened displaying the placement of a bike 30 within. The bike 30 is partly disassembled so that the front wheel of the bike, the seat, the handle bars, and the pedals can be stored within the case in a way that the total size of the bike carrying case 10 may be reduced. Although it is possible within the concept of this invention to design the case to hold a fully assembled bike, many of the advantages would be compromised. In the preferred embodiment shown in the drawing the frame of the bike is placed in the case such that the horizontal frame tubing 31 falls above the top edge 15 of the aperture 12 in the case 10. The bike 30 when in the case, rests against a cushioning material 20 which lines the case and serves to protect the bike 30 from shifting within the case and may be impregnated with an anti-rust agent which protects the bike when being carried or stored.

Figure 4:
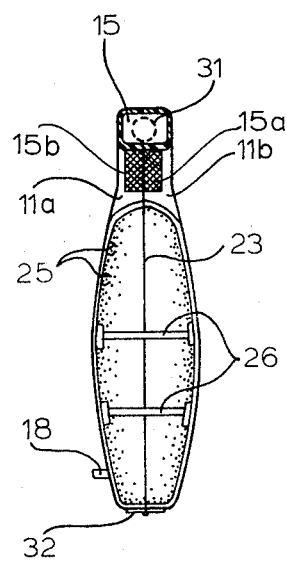
FIG. 4 shows a section of the bicycle carrying case of the invention taken along line 4—4 of FIG. 2.

Now referring to FIG. 4, a medial section of an illustration of the bicycle carrying case is seen to consist of two corresponding walls 11a and 11b. The external division of these two walls is designated by the seam 23 formed by the junction of the two walls. Located at uppermost portion of the walls 11a and 11b there are sections of the wall defining the shoulder bar 15 which forms a channel in which the horizontal frame tubing 31 of a bike rests. This arrangement enhances the strength of the shoulder bar 15 by which the invention is carried.

On the inside of the case 10, brackets or clips are mounted which include; equipment clips 25 which are used to secure pedals, the seat, or tools and demountable strenghtening braces 26 designed to protect the case from inward crushing forces. A hinge 32 is secured at the bottom of case 10. Optionally, wheels may be attached to or affixed to the case.

Figure 5:
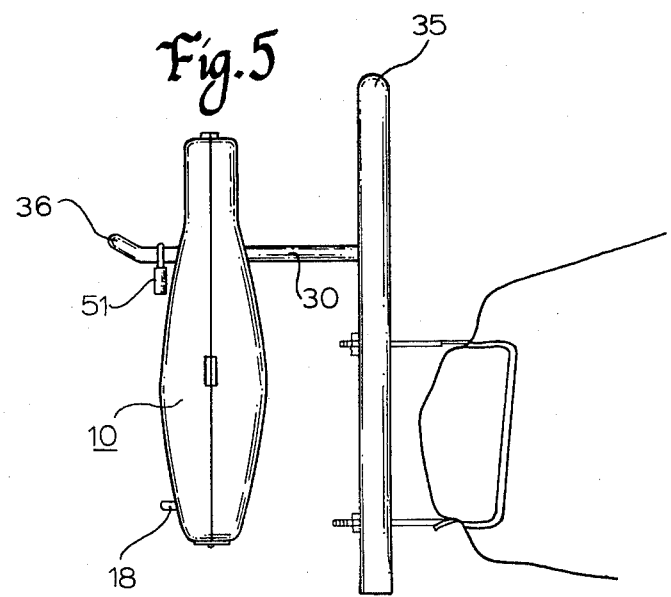
FIG. 5 shows the bicycle carrying case of the invention in place on a conventional automobile carrying rack.
Figure 7:
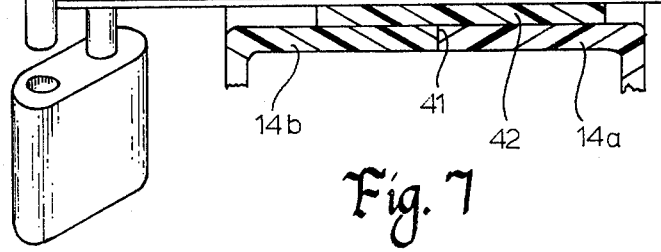
FIG. 7 is a cross-sectional view of a waterproof through opening.

Now referring to FIGS. 5 and 7 an illustration of the bicycle carrying case 10 is placed on a conventional automobile bike rack 35 is seen. The bicycle carrying case 10 is placed on the bike rack 35 by sliding the rack bars 36 through the rack holes 13 and tubular extension 14 seen in FIG. 5. The spacing of the rack holes 13 is designed to fit most bike racks available today. The length of the tubular extension 14A and 14B is such that the pendulum movement by a bicycle is reduced to a minimum during transport. The bike carrying case 10 can be secured to a bike rack 35 by either straps or held in place by a padlock 51 extending through a hole in bar 30.

Figure 6:
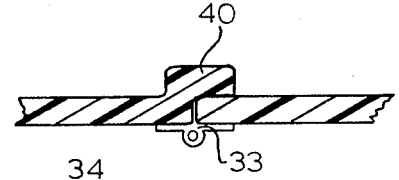
FIG. 6 is a cross-sectional view of two types of hinges suitable for use with the bicycle carrying case of the invention.
Figure 6:

Now referring to FIG. 6, two types of hinges suitable for use on the bicycle carrying case 10 seen in FIGS. 1–5 are illustrated. The piano type hinge 33 in 6B when mounted extends ¾ of the length of the case 10 and is mounted on the outside of the case. When the piano hinge is used the area in the exterior of the case is seen to have an overlap 40 of the sides which aids in the water proofing of the case. FIG. 6B depicts an integral or living hinge 34 which can be made of polyethylene, polypropylene or other similar material as would be the entire shell of the bicycle case. The integral hinge 34 is sufficiently resilient to allow repeated opening of the case and still maintain the moisture proof environment desired of the case 10.

Now referring in more detail to FIG. 7, for one type of water proof through opening an enlarged view of the tubular extension 14 is seen formed when the two side walls 11 close creating the junction 41 between the extention parts 14a and 14b. Attached to the tubular extension 14a is a sleeve 42 which underlaps extension 14b and maintains the tubular extension 14 and two side walls 11 in proper position. The tubular extension 14 surrounds a rack bar 36 thus showing the relationship of the two when the case is mounted on a bike rack. Lock 43 prevents the case from being removed since it is larger than the diameter of the opening 13 through the case. Other types of through openings and seals may be used. This invention may be produced in various sizes to accommodate different sizes and styles of bicycles. It is useful as well for women's bicycles even in the absence of upper bars since the case itself has sufficient strength to allow carrying over the shoulder while the bicycle is supported within the case at several points.

The above described embodiments of this invention are merely descriptive of its principles and are not to be considered limiting. The scope of this invention instead shall be determined from the scope of the following claims including their equivalents.

What is claimed is:

1. A bicycle container comprising:

a container body dimensioned to hold a bicycle therein including a closure openable to allow the introduction of a bicycle into said container body and closable to secure the bicycle therein;

said container body including an aperture therethrough positioned to coincide with an open region of the frame of the bicycle contained therein;

whereby said bicycle container may be carried by engagement therewith through said opening; and wherein said aperture is of sufficient size to allow the container to be carried on the shoulder with a person's arm extending therethrough.

2. A bicycle container comprising:

a container body dimensioned to hold a bicycle therein including a closure openable to allow the introduction of a bicycle into said container body and closable to secure the bicycle therein;

said container body including an aperture therethrough positioned to coincide with an open region of the frame of the bicycle contained therein;

whereby said bicycle container may be carried by engagement therewith through said opening; and wherein said aperture corresponds to the generally triangular opening in the frame of a men's style bicycle.

3. A bicycle container comprising a unitary plastic body including a pair of side portions configured to define an enclosure for a bicycle including an integral hinge along one juncture between the two side portions and means securing the two side portions together to enclose a bicycle therein;

wherein said side portions conform generally to the external dimensions of a bicycle with the front wheel removed and the handle bars removed or positioned extending generally vertically;

including demountable means securable between opposite side portions of said container body to resist inward crushing forces applied to the container; and wherein said demountable means comprises a bar and mating socket means positioning said bar to engage both sides of said container.

4. A bicycle container comprising:

a container body dimensioned to hold a bicycle therein including a closure openable to allow the introduction of a bicycle into said container body and closable to secure the bicycle therein;

said container body including an aperture therethrough positioned to coincide with an open region of the frame of the bicycle contained therein;

whereby said bicycle container may be carried by engagement therewith through said opening;

wherein said container body and closure comprise a pair of near identical side members hinged together at one side thereof to define said container body when pivoted together;

wherein said side members are hinged together along the bottom length thereof and including latch means on the upper edge thereof; and wherein said aperture is of sufficient size to allow the container to be carried on the shoulder with a person's arm extending therethrough.

* * * * *